June 23, 1931.　　　　L. HORSTMAN　　　　1,810,966
SIGNAL FOR TURNING CORNERS
Filed Feb. 10, 1930　　2 Sheets-Sheet 1
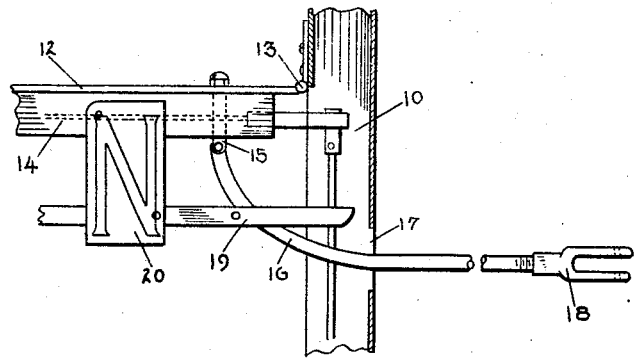
FIG. 3
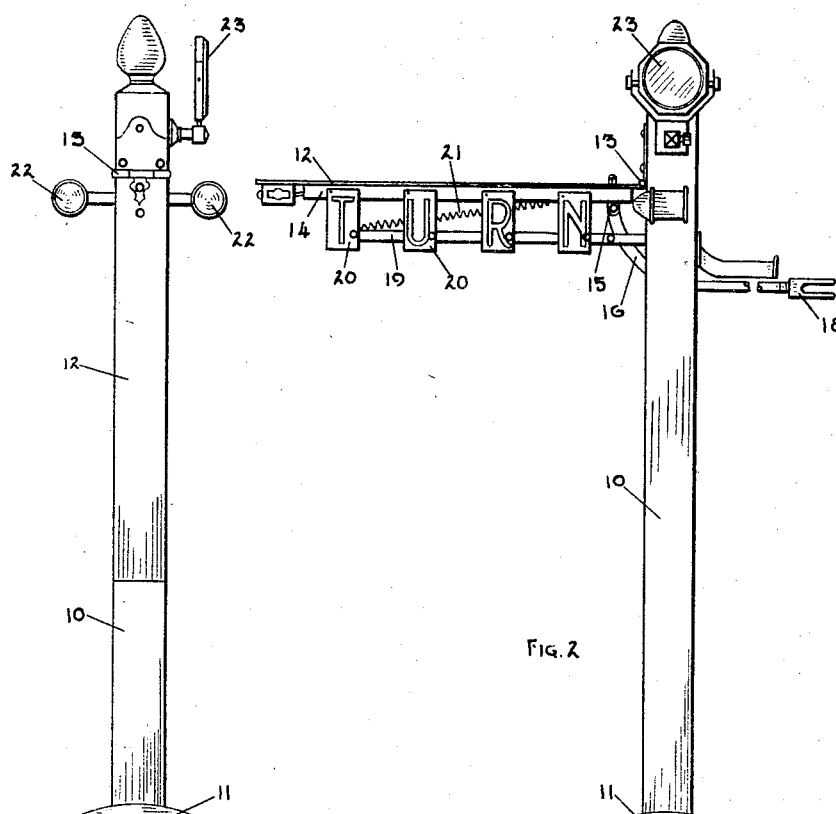
FIG. 1　　　　　　　FIG. 2
Inventor
LOUIS HORSTMAN
By 
Attorney June 23, 1931.  L. HORSTMAN  1,810,966
SIGNAL FOR TURNING CORNERS
Filed Feb. 10, 1930  2 Sheets-Sheet 2
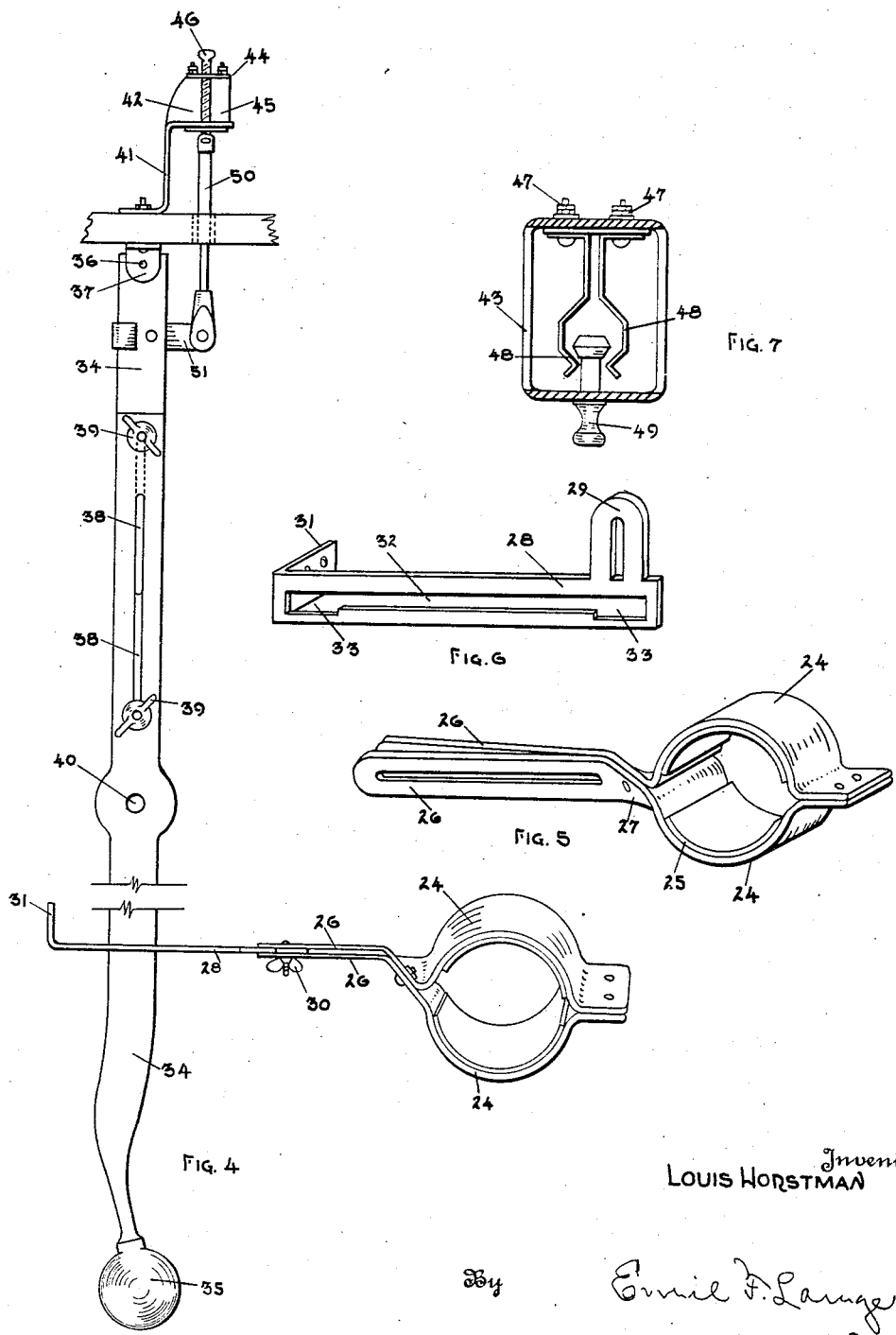
Inventor
LOUIS HORSTMAN
By Emil F. Lange
Attorney Patented June 23, 1931

1,810,966

UNITED STATES PATENT OFFICE

LOUIS HORSTMAN, OF STERLING, NEBRASKA

SIGNAL FOR TURNING CORNERS

Application filed February 10, 1930. Serial No. 427,337.

My invention relates to turning signals for automobiles, the primary object of the invention being the provision of a signal which may be attached to the automobile to indicate turns.

Another of my objects is the provision of indicia pivotally mounted on parallel arms which may be actuated from the driver's position in the automobile regardless of whether the automobile is of the open or closed type.

Another of my objects is the provision of devices for illuminating the indicia so that the signal is visible both from the front and from the rear during night driving.

Another of my objects is the provision of a signal having a rear vision mirror so that the driver will be enabled to observe the actions of another driver in the rear who receives the signal.

Another of my objects is the provision of a pedestal support for the indicia, the illuminating devices and the rear vision mirror, the support being attractive and ornamental in appearance.

Another of my objects is the provision of a pedestal for supporting the indicia, the pedestal being hollow and adapted to receive the folded arm when in non-signal position.

It is also my object to provide operating mechanism for the turning signal, the operating mechanism being within convenient reach of the driver and being adjustable both for the particular automobile and for the driver.

Having in view these objects and others which will be pointed out in the following description, I will now refer to the drawings, in which Figure 1 is a side elevational view of the pedestal in its closed position and showing also the illuminating devices and the rear vision mirror.

Figure 2 is a rear elevational view of the pedestal with the signalling indicia in operative position and showing also the rear illuminating device and the rear vision mirror.

Figure 3 is an enlarged view of a portion of Figure 2, the pedestal being shown in section.

Figure 4 is a plan view of the mechanism for extending and retracting the signalling indicia.

Figure 5 is a view in perspective of the clamp which supports the operating mechanism on the steering post of the automobile and of the arm which is integral with the clamp.

Figure 6 is a perspective view of the guiding and latching member for the operating lever.

Figure 7 is a view partly in plan and partly in section showing the means whereby the circuit to the lamps is automatically opened and closed.

The pedestal 10 has a base 11 which is adapted to be secured to the running board of the automobile on the left-hand side of the automobile. It is preferably square in horizontal section, the interior being hollow. A portion of the outer side of the pedestal is left open and this opening is provided with the closure 12 which is hinged at 13. Secured to the closure 12 is a bracket 14 having a projection 15 to which is pivotally secured a curved arm 16. This arm 16 passes through an opening 17 in the inner wall of the pedestal 10 and terminates in a fork 18 as shown in Figures 2 and 3. The purpose of this fork is to be explained in connection with the description of the operating mechanism. It is evident, however, that the movement of the curved arm will move the closure 12 from the Figure 1 position to the Figure 2 position or vice versa.

Parallel to the closure 12 and its brace 14 is a link 19. The plates 20 are pivotally secured to the bracket 14 and to the link 19, the pivots being at diagonal points in which the upper pivot is on the outward side and the lower pivot on the inward side. The number of these plates 20 depends on the character of the indicia. In my drawings I show four plates 20 having the letters T-U-R-N to indicate the intention on the part of the driver to turn. The outward movement of the lever arm 16 will cause these plates 20 to become spaced as shown in Figure 2. The reverse movement of the arm 16 will cause the plates to move closer to each other so that they will be seated within the hollow portion of the pedestal 10 which will then appear as shown in Figure 1. For facilitating the movement of the lever arm 16, I provide a counterbalancing spring 21 which is connected to the link 19 near its outer extremity and to the brace 14 near its inner extremity.

For night driving it is desirable that the signal be illuminated. I have therefore provided two lamps 22 of the parking lamp type, these being connected in a circuit within the pedestal and having an automatic circuit closing device operable by the movement of the signal arm to signal position. On the rear side of the pedestal 10 is a rear vision mirror 23 which may be adjusted into any desired position for the convenience of the driver.

The actuating mechanism for the signal is shown in Figures 4, 5 and 6. The clamp 24 is adapted to embrace the steering post of the automobile. It is lined with padding 25 to avoid marring the finish of the steering post. This clamp 24 is of the usual clamp type but at one end it is extended in the form of two slotted arms 26. These arms are twisted at 27 so as to bring the arms into horizontal position when the clamp 24 is applied to the steering post. The bracket 28 is adjustably secured to and between the arms 26. The bracket 28 is provided with a slotted ear 29 which is embraced by the two arms 26, a thumb nut 30 being employed to clamp these two members together in adjusted position. Owing to the length of the slots in the arms 26, the combined length of the arms 26 and bracket 28 may be altered within wide limits. The bracket 28 is bent at right angles at 31 which is provided with apertures for attachment to the automobile. The bracket 28 is also provided with a slot 32 having steps 33 at its ends for determining the limits of movement of the lever and for releasably latching the lever in either of its two positions.

The lever 34 is seated for sliding movements in the notch 32 of the bracket 28. At its end nearest the driver it is provided with any suitable handle 35. The lever is pivoted at 36 to a bracket 37 which is secured to the footboard of the automobile. The lever 34 is also adjustable in length, being formed of two sections each provided with slots 38 and with thumb nuts 39 for latching the two lever sections into adjusted position. The purpose of this adjustment is, of course, to bring the handle 35 into the most convenient position for the driver of the car.

The lever 34 is also provided with an aperture 40. The fork 18 is adapted to embrace the lever 34 to which it is pivotally secured by means of a pin passing through the fork and through the aperture 40. It is thus possible from the driver's position to easily shift the lever 34 to either the right or the left in order to extend or retract the signalling indicia 20 with their parallel movement mechanism.

Secured to the rear side of the footboard is a bracket 41 which terminates in a clamp 42. In the rear of the clamp is a box 43 of which the top and bottom walls 44 overhang the extension 45 of the bracket 41. The box 43 is designed to enclose the switch for controlling the current through any suitable sound signal such as a bell. The upper overhanging portion 44 of the box 43 is provided with a screw threaded aperture for receiving the set screw 46, the set screw being adapted to bear against the right angle extension 42 to clamp the box 43 firmly in place. The box 43 is provided with two binding posts 47 in the usual manner. The switch includes the stationary member 48 and the slidable member 49 which latter is connected to a slidable arm 50. This arm 50 passes through the footboard of the automobile and it is pivotally connected at its end inside the car with a bracket 51 which is firmly secured to the lever 34. It is apparent that the movement of the lever in one direction will automatically open the circuit through the switch and that a movement of the lever in the opposite direction will close the circuit.

The operating mechanism above described includes various adjustments which adapt it to any particular set of conditions normally found in the cars now on the market. The clamp 24 and the ear 31 are each to be secured to fixed positions in the car but these two fixed positions vary between wide limits in the various makes of cars. The adjustment through the slots is, however, ample for the adjusting device to the various cars. Likewise the position of the footboard frequently varies with respect to the driver's position but this can easily be taken care of by shortening or lengthening the hand lever 34. This latter adjustment is also useful for adjusting the position of the hand grip 35 to the most convenient position which frequently depends on the size of the driver or on the length of the driver's arms.

The device is ornamental. Its form alone is ornamental but it is also nickel plated in order to increase its attractiveness. The pedestal is conspicuous so that it readily attracts the attention of other drivers and the movement of the signal itself is also conspicuous. The two lamps 22 illuminate both the front and the rear of the signal at night when the signal would be otherwise useless. The rear illumination warns drivers in the rear of any turning movement while the illumination at the front of the signal is conveyed to the driver of the car ahead through his rear vision mirror so that it will enable him to govern his movements accordingly.

Having thus described my invention in such full, clear, and exact terms that its construction and operation will be readily understood by others skilled in the art to which it pertains, what I claim as new and desire to secure by Letters Patent of the United States is:

1. Operating mechanism for a turning signal for automobiles in which a pivoted signal arm is movable to operative and inoperative positions and displays turning indicia in its operative position, said operating mechanism including a hand lever adapted for attachment to the footboard of the automobile, an extensibly adjustable guide member adapted for attachment at its extremities to the steering post and to a side wall respectively of the automobile, a connection between said lever and the signal arm for moving the signal arm to operative or inoperative position in response to the movements of said lever, and means for adjustably altering the length of said lever.

2. Operating mechanism for a turning signal for automobiles in which a pivoted signal arm moves to operative and inoperative positions and displays turning indicia in its operative position, said operating mechanism including a collar adapted for clamping engagement to the steering post of the automobile, an adjustably extensible arm projecting horizontally from said collar, means at the outer extremity of said arm for attachment to a side wall of the automobile body, a lever adapted to be pivotally secured to the footboard of the automobile, the outer portion of said arm being slotted for receiving the free end portion of said lever to limit the movements thereof, means on said arm for releasably latching said lever in either of two positions, and means on said lever for connection with the signal arm for actuating the signal arm.

In testimony whereof I affix my signature.

LOUIS HORSTMAN.